Aug. 23, 1960 J. G. TRYON 2,950,461

SWITCHING CIRCUITS

Filed Dec. 13, 1954 9 Sheets-Sheet 1

INVENTOR
J. G. TRYON
BY H. O. Wright
ATTORNEY

Aug. 23, 1960 J. G. TRYON 2,950,461

SWITCHING CIRCUITS

Filed Dec. 13, 1954 9 Sheets-Sheet 2

INVENTOR
J. G. TRYON
BY
H. O. Wright
ATTORNEY

INVENTOR
J. G. TRYON
BY H. O. Wright
ATTORNEY

Aug. 23, 1960 J. G. TRYON 2,950,461

SWITCHING CIRCUITS

Filed Dec. 13, 1954 9 Sheets-Sheet 4

INVENTOR
J. G. TRYON
BY
H. O. Wright
ATTORNEY

INVENTOR
J. G. TRYON
BY H. O. Wright
ATTORNEY

Aug. 23, 1960 J. G. TRYON 2,950,461

SWITCHING CIRCUITS

Filed Dec. 13, 1954 9 Sheets-Sheet 6

INVENTOR
J. G. TRYON
BY H. O. Wright
ATTORNEY

INVENTOR
J. G. TRYON
BY
H. O. Wright
ATTORNEY

Aug. 23, 1960 J. G. TRYON 2,950,461

SWITCHING CIRCUITS

Filed Dec. 13, 1954 9 Sheets-Sheet 8

INVENTOR
J. G. TRYON
BY H. O. Wright
ATTORNEY

INVENTOR
J. G. TRYON
BY H. O. Wright
ATTORNEY 2,950,461

SWITCHING CIRCUITS

John G. Tryon, Chatham, N.J., assignor to Bell Telephone Laboratories, Incorporated, New York, N.Y., a corporation of New York Filed Dec. 13, 1954, Ser. No. 474,659

13 Claims. (Cl. 340—147)

The present invention relates to electrical switching circuits, and more particularly to switching circuits for use in digital information handling systems.

In ordinary electrical circuits, when it is desired to switch from one signal to another, the connections to the undesired signals are interrupted, and a connection is established to the desired signal. When the connections to the undesired signals are opened, these signals are blocked. This method of "switching by blocking" is simple to understand and to apply, and has, quite naturally, been carried over into the field of electronic switching.

Electronic systems for handling digital information are often built up of logic circuits termed "AND" units and "OR" units. As suggested by their names, an "AND" unit transmits an output signal only when all of its input circuits are energized, while an "OR" unit yields an output signal if any input is energized. A conventional blocking switch is realized in logical circuit terms by the use of two or more AND units connected to a single OR unit. Each AND unit has a signal input and a control input. To connect the signal associated with one AND unit to the output of the OR unit the control input of the selected AND unit must be energized to gate the desired signal through the AND unit, while the control inputs of the other AND units are de-energized and the associated signals are thus blocked. The principles of "switching by blocking" as suggested above can be readily extended to more complex switching systems. However, when switching by blocking techniques are employed in complex switching circuits, the circuits may become unduly complex and use more equipment than is necessary.

Accordingly, the principal object of the present invention is the simplification of digital switching circuits.

In accordance with a broad aspect of the present invention, the output of two or more OR units are connected to the respective inputs of a single AND unit. Each OR unit has a signal input and at least one control input, and the signal input associated with a selected OR unit is connected to the output of the AND unit by de-energizing the control input of the selected OR unit, and energizing at least one control input of each of the other OR units. The energization of the control circuits associated with the undesired signals obliterates these signals by converting them to the value "one." In addition, the desired signal is gated through to the output of the AND unit by the presence of signals on all of the other inputs to the AND unit. This mode of circuit operation has been termed "switching by swamping" to contrast it with the conventional "switching by blocking" circuits, of the prior art, described above.

The basic "switching by swamping" circuit discussed above is often more economical than the corresponding blocking circuit. This is a result of the greater number of OR units and lesser number of AND units employed in "switching by swamping" circuits as compared with blocking circuits, coupled with the fact that OR units are often less expensive than AND units.

Use of "switching by swamping" circuitry in larger circuits often leads to designs in which other economies and advantages are realized. For example, in circuits involving successive banks of logic units, one or more banks can often be eliminated by the use of "switching by swamping" techniques. In addition, the use of "switching by swamping" in complex circuits may reduce the cost of the circuit by reducing power requirements on critical leads, by calling for less expensive logic units, or by reducing the delay introduced by the circuit.

Several noteworthy specific circuits in which one or more of the foregoing advantages are secured will now be mentioned briefly, by way of illustrative examples. When "switching by swamping" is employed in a converging switch at the output of the storage unit of a serial binary computer, the delay in transferring numbers between the storage unit and other units of the computer is substantially reduced, and substantial savings in equipment are obtained. "Switching by swamping" may also advantageously be used in switches following a diode matrix such as that often used in the program unit of a computer. Under these circumstances, the OR units in the first level of the switches are consolidated with the OR units forming the diode matrix, and one level of switching is eliminated. When "switching by swamping" techniques are employed in a shift register of a serial binary computer, savings in equipment can be obtained in each stage of the register. Illustrative examples of each of the foregoing circuits will be described in detail hereinafter in the body of the present specification.

Other objects and various additional features and advantages of the invention will become apparent in the course of the detailed description of illustrative circuits shown in the accompanying drawings and from the appended claims.

Figure 6:
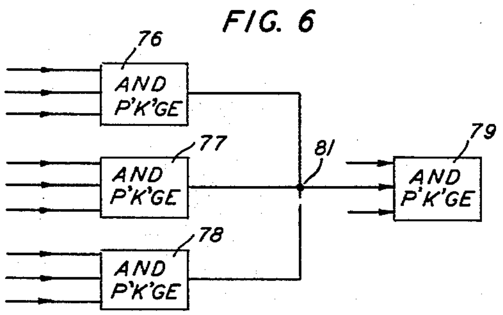
Figure 7:
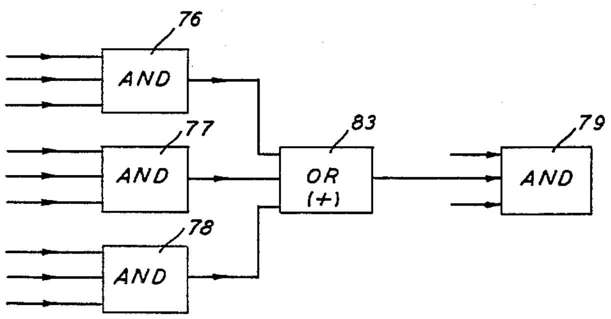
Figure 8A:
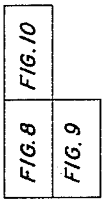
Figure 8:
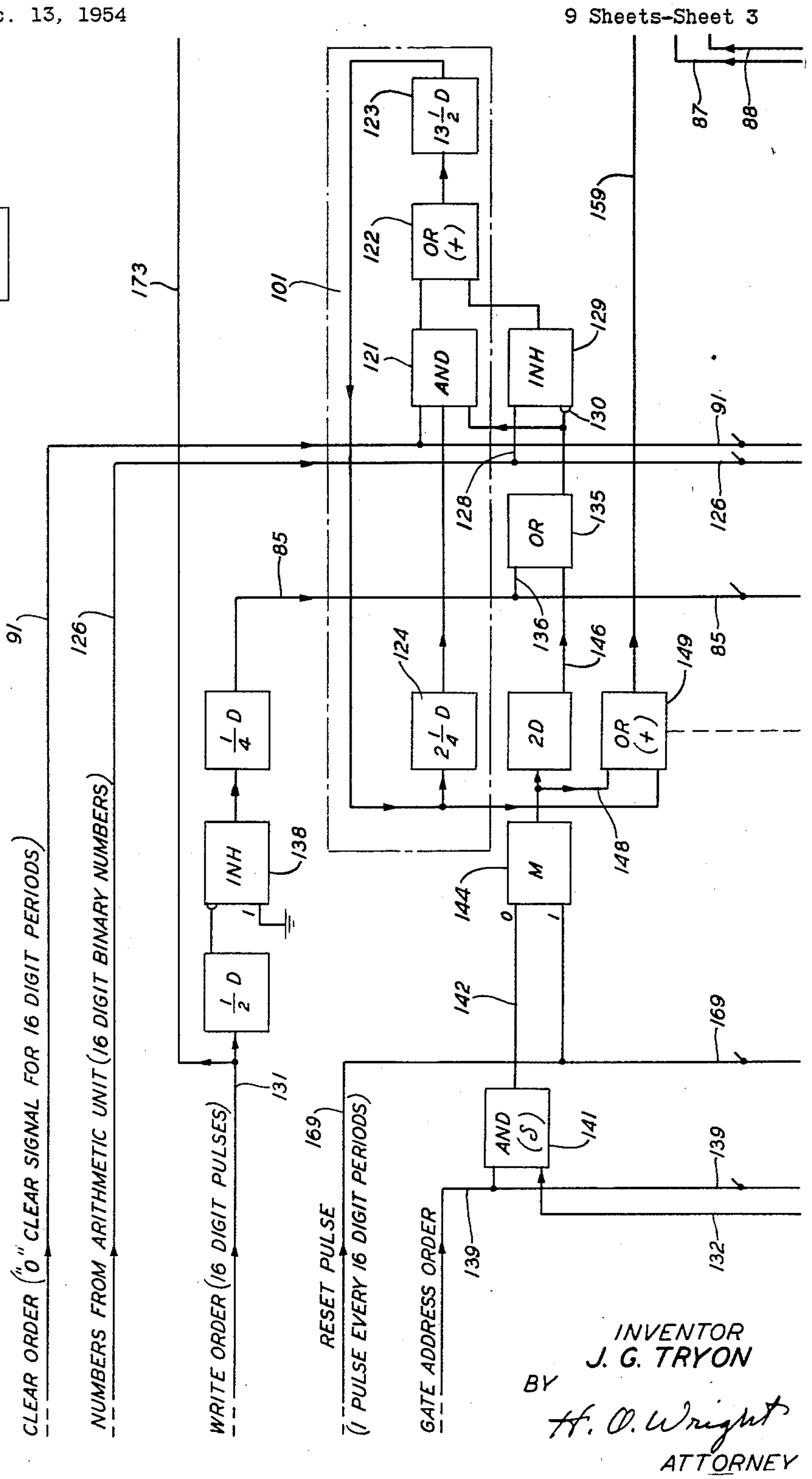
Figure 9:
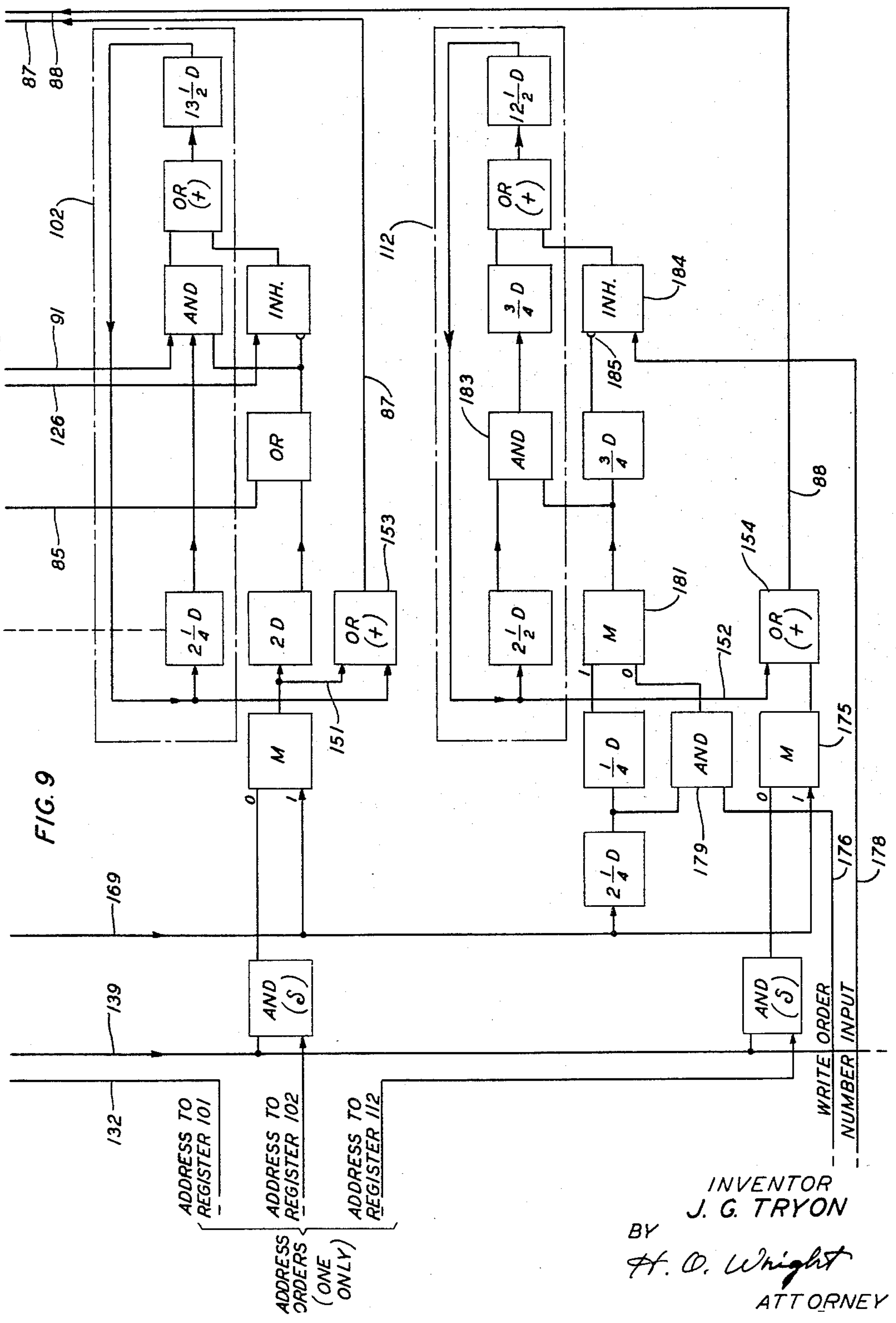
Figure 10:
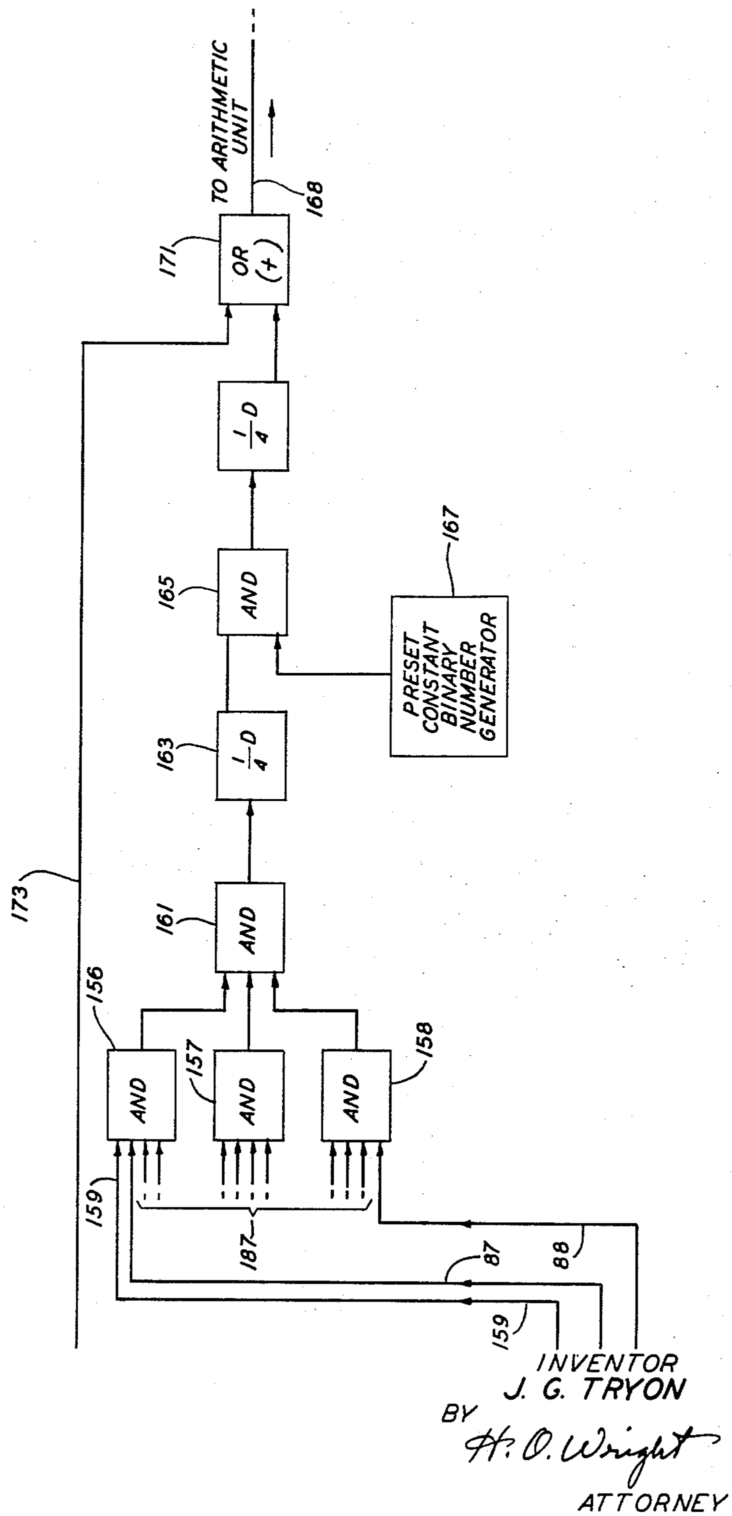

Figs. 6 and 7 serve to contrast the actual connections required for a converging switch the resulting logical circuit diagram;

Fig. 8–A indicates the manner in which Figs. 8, 9 and 10 are associated.

Figure 11:
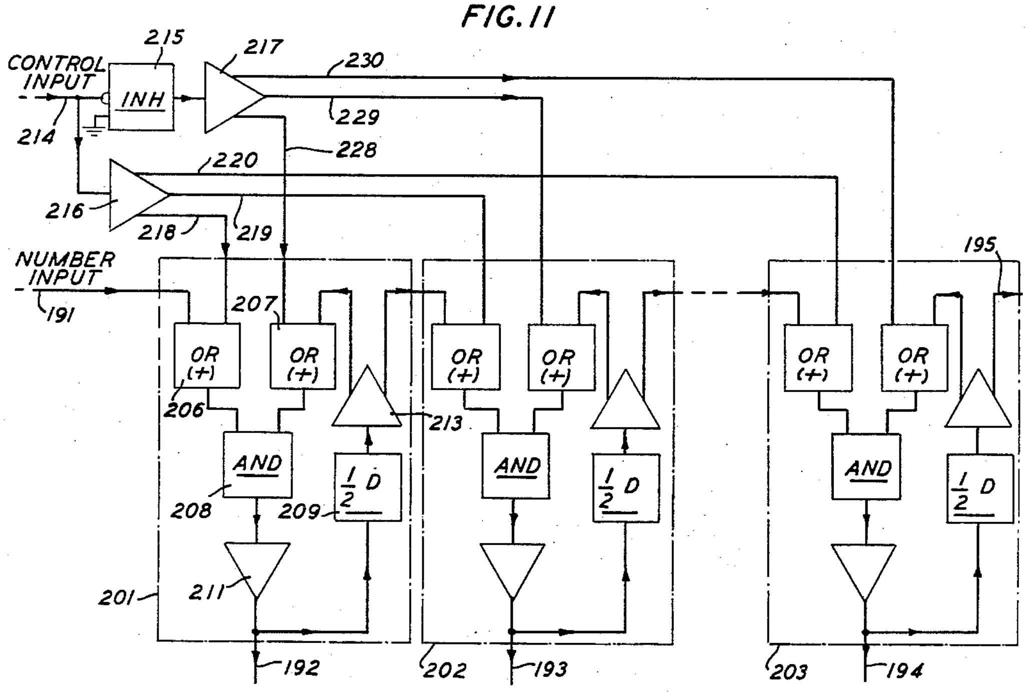
Figure 12:
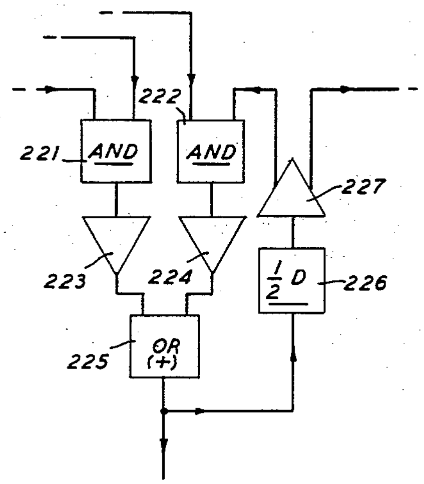
Figure 13:
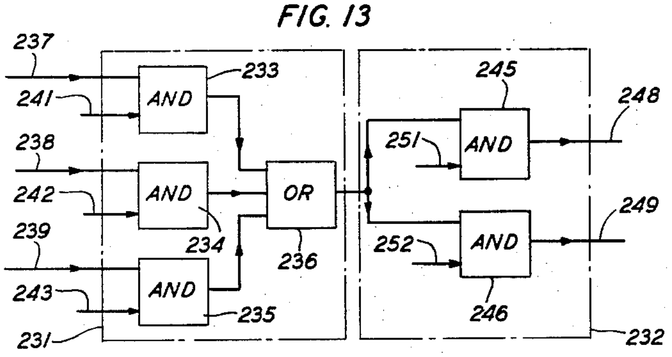
Figure 14:
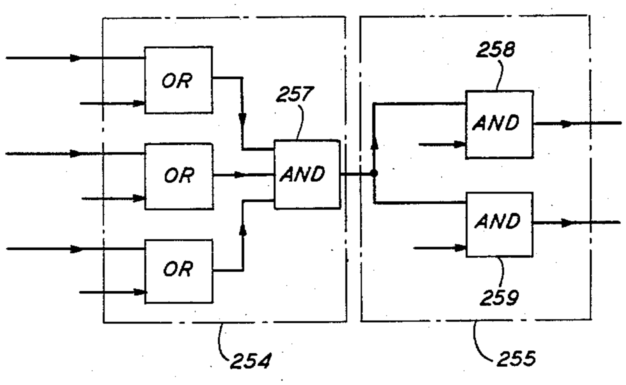
Figure 15:
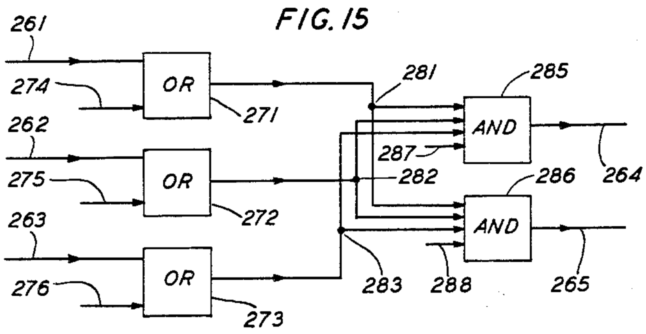
Figure 16:
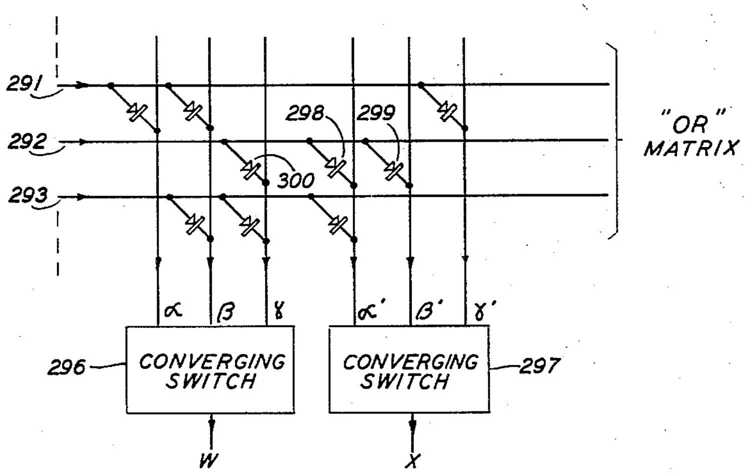
Figure 17:
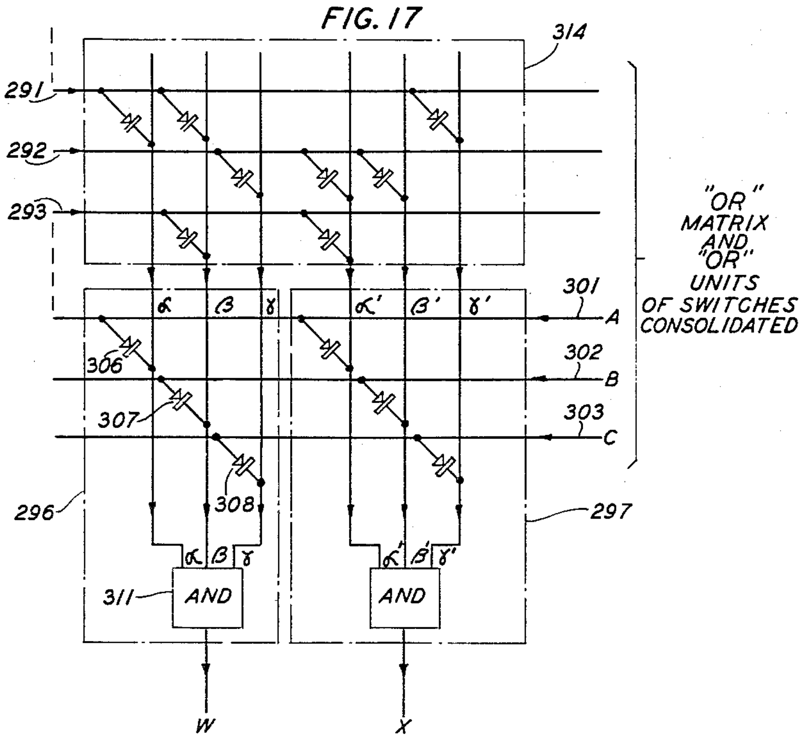
Figure 18:
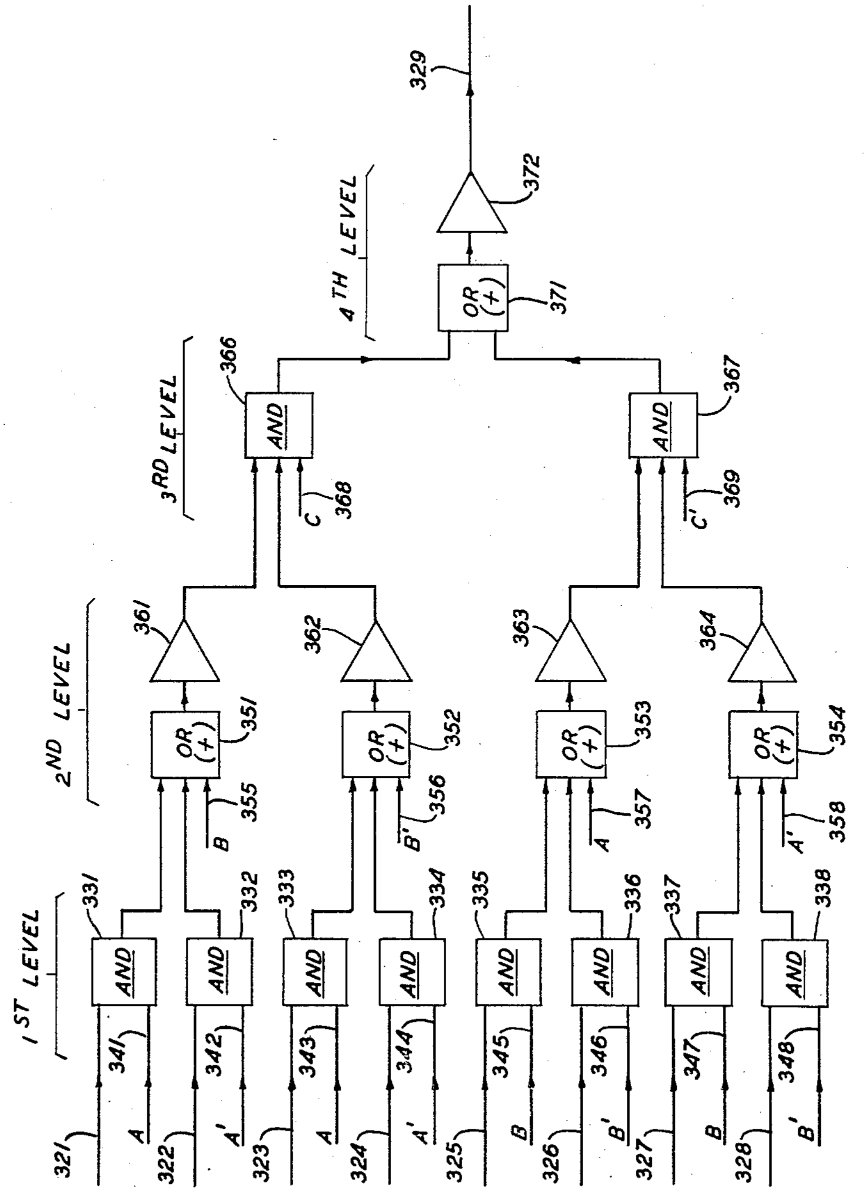

Figs. 8, 9 and 10 illustrate the application of the principles of "switching by swamping" to a computer storage register;

Fig. 11 shows the principles of "switching by swamping" as applied to a computer shift register;

Fig. 12 shows one stage of the shift register circuit of Fig. 11 as it would be realized in conventional "switching by blocking" form;

Fig. 13 is a convergent-divergent switch employing blocking switches throughout;

Fig. 14 shows a convergent-divergent switch employing "switching by swamping" in the convergent section and blocking switch in the divergent section;

Fig. 15 shows the circuit of Fig. 14 after the consolidation which is possible when successive levels of logic circuit elements are of the same type;

Figs. 16 and 17 show the application of the principles of the invention to a triple address program unit and Fig. 18 shows a converging "tree" switch using both blocking and "swamping" techniques with consolidation.

Figure 1:
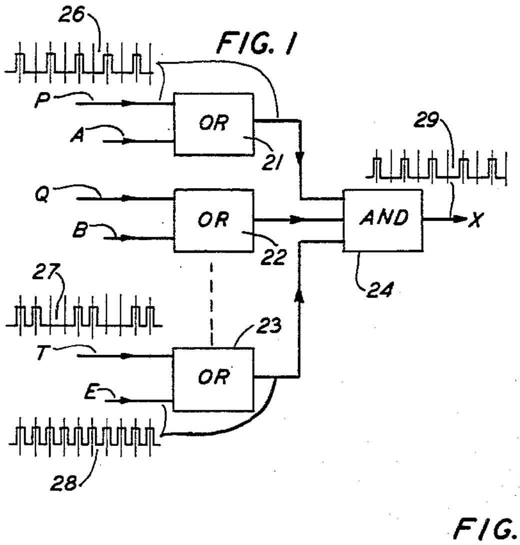
Fig. 1 shows a basic "switching by swamping" circuit in accordance with the invention.

Referring more particularly to the drawings, Fig. 1 shows, by way of example and for purposes of illustration, a basic form of the "switching by swamping" circuitry. In Fig. 1, the OR units 21, 22 . . . 23 are connected to the AND unit 24. The number of OR units may be only two, or may be increased up to the input capacity of the AND unit 24, which may, for example, be five or six inputs. The signal input leads to the OR units 21, 22, . . . 23 are designated P, Q, . . . T, respectively, and the control input leads are designated A, B, . . . E, respectively. When it is desired to connect signal P associated with OR unit 21 with output X of the AND unit 24, the control lead A of OR unit 21 is de-energized, while the control input leads B, E, of all of the other OR units are energized. Because one control lead is de-energized while the other leads are energized, this is termed a "one cold" selection circuit.

By way of example, the input signals at P, Q, and T may be pulse trains representing serial binary information. For specific illustration, a pulse train made up of alternate pulses and spaces, such as that shown at 26 in Fig. 1, may be applied to input P of OR unit 21. Similarly, a pulse train 27 made up of successive groups of two pulses and two spaces, may be applied to signal input T of OR unit 23. When signal P is selected, control lead A is de-energized, and the other control leads B, E are energized with a continuous train of pulses as indicated at 28 of Fig. 1. With a continuous train of pulses applied to control leads B, E, the output from OR units 22, 23 will also be a continuous train of pulses. The signal pattern 27 applied to signal input lead T is thus obliterated by conversion to a continuous train of pulses in the OR unit 23. Similarly, the output from all other OR units, except OR unit 21, is a continuous train of pulses. With control lead A de-energized, however, the signal applied to input lead P will pass through OR unit 21 unchanged.

The AND unit 24 requires input pulses on all three input leads in order to produce an output pulse. The continuous trains of output pulses from OR units 22, 23 provide the required gating signals for the pulse signals 26 from OR unit 21. Accordingly, pulse train 26 from signal P appears at the output X of AND unit 24 as indicated at 29.

In the "switching by swamping" circuit of Fig. 1, it may be desired to transmit no information from any of the signal inputs P, Q, T to the output X of the AND unit 24. This is accomplished by energizing all of the control inputs A, B, . . . E by the continuous train of pulses represented by graph 28 of Fig. 1. All of the inputs to the AND unit 24 are then energized by continuous trains of pulses, and the output at X will also be a continuous (informationless) train of pulses.

Figure 2:
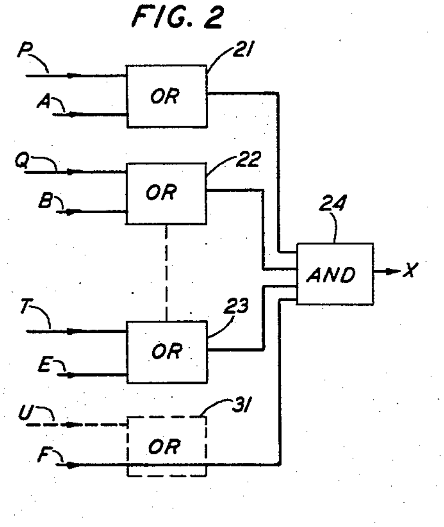
Fig. 2 shows another form of the circuit of Fig. 1 in which there is no output from the switch when it is in the "off" condition.

In some cases, however, it is undesirable for the informationless or "off" state of a switch to involve a continuous train of output pulses. This can be avoided as shown in Fig. 2 by the addition of another control input F. This can be readily understood through the use of the phantom OR unit 31 having a "dummy" signal input U which is always zero. When dummy input U is selected by de-energization of control lead F, the AND unit will have zero output. In practice, the OR unit 31 and the dummy signal input U may be dispensed with, and the control lead F is connected directly to the AND unit 24.

Figure 3:
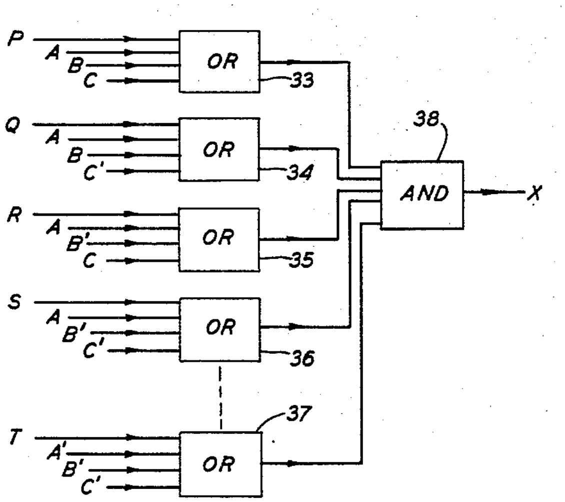
Fig. 3 shows a switching circuit in which the signal is selected by means of binary coded inputs associated with each of the signal input circuits.

Fig. 3 illustrates a "switching by swamping" converging switch in which a three digit binary code is employed to control the selection of signal input. The logical circuit in Fig. 3 includes the OR units 33, 34, 35, 36 . . . 37 and the AND unit 38 having input circuits connected respectively to the output circuit of each of the OR units. The signal input circuits P, Q, R, S, . . . T are associated with the OR unit 33 through 37 respectively. When a three digit binary code is employed only eight permutations of the three binary digits are possible; and therefore only eight or less OR units may be employed. There are three control leads associated with each OR unit in addition to the signal input lead. These control leads are designated by the letters A, B, and C, or A′, B′, and C′. The primed letters indicate the negation of the unprimed letters. Thus, for example, if a continuous train of pulses is applied to lead A, the lead A′ will have no signal applied thereto, and vice versa. As in the circuits of Figs. 1 and 2, a signal lead is selected by the de-energization of the control leads connected to the associated OR unit. Thus, for example, signal P, associated with the OR unit 33 is selected by the de-energization of all three control input leads A, B, and C. As indicated in Table I, any of the OR units 33 through 37 may be selected by appropriately energizing control leads A, B, and C, and applying the corresponding negated signals on leads A′, B′, and C′.

*Table I*

| Binary Control Input Energization Code | | | | | | Selected "OR" Unit |
|---|---|---|---|---|---|---|
| A | A′ | B | B′ | C | C′ | |
| 0 | 1 | 0 | 1 | 0 | 1 | 33 (A, B, C) |
| 0 | 1 | 0 | 1 | 1 | 0 | 34 (A, B, C′) |
| 0 | 1 | 1 | 0 | 0 | 1 | 35 (A, B′, C) |
| 0 | 1 | 1 | 0 | 1 | 0 | 36 (A, B′, C′) |
| 1 | 0 | 0 | 1 | 0 | 1 | ---------------- |
| 1 | 0 | 0 | 1 | 1 | 0 | ---------------- |
| 1 | 0 | 1 | 0 | 0 | 1 | ---------------- |
| 1 | 0 | 1 | 0 | 1 | 0 | 37 (A′, B′, C′) |

The fundamental principles of the "switching by swamping" technique have been described in Figs. 1 through 3. This switching technique is particularly useful when it leads to circuits which are more economical than the corresponding conventional blocking circuits. This is often true if OR units are cheaper than AND units in the technology which is under consideration. In addition, the use of "switching by swamping" often leads to consolidation of levels or banks of OR and AND units and thus serves to eliminate many of the logic circuit units. To provide concrete examples of economies which are obtained from the use of "switching by swamping" techniques, actual circuits which are used in one computer technology will now be disclosed.

Figure 4:
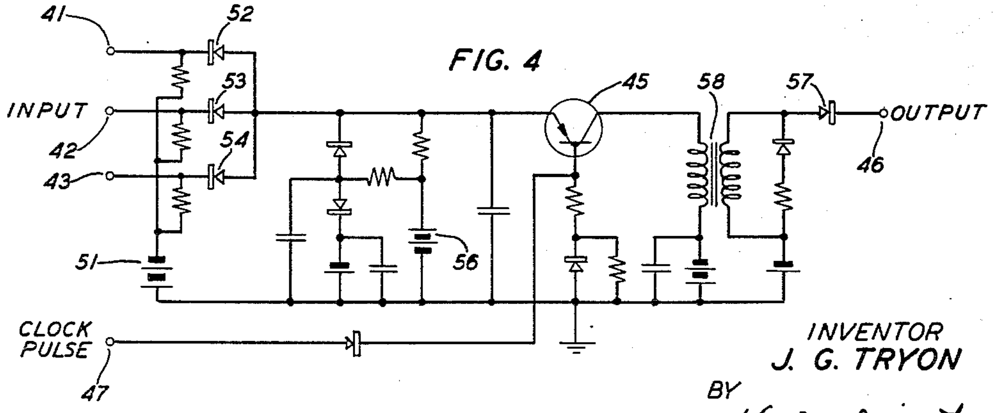
Fig. 4 shows the detailed circuit diagram of one form of AND unit.

In Fig. 4, a detailed circuit diagram of an AND unit is shown. If all three inputs 41, 42, and 43 are energized by positive-going pulses the transistor 45 starts to conduct and an output pulse appears at terminal 46. The circuit of Fig. 4 includes a pulse regenerator circuit, and the output pulses at terminal 46 are controlled by clock pulses which are applied to terminal 47. These clock pulses are derived from a standard frequency source in the computer and insure synchronization of all the timed operations of the computer. When the transistor 45 of Fig. 4 is in the off condition, terminals 41, 42, and 43 are maintained at a slightly negative voltage by the voltage source 51. In addition, a small amount of current flows through the diodes 52, 53, and 54 in the low resistance direction from the positive voltage source 56, to the negative voltage source 51. This maintains the emitter of the transistor 45 negative with respect to the base of the transistor, and the transistor remains cut off. When one of the input leads 41, 42, 43 is energized by a positive going pulse, it merely serves to bias the associated diode 52, 53, 54, into the high resistance direction but has no effect on the emitter circuit. When all three inputs 41, 42, 43 receive positive pulses, however, the negative voltage source 51 is isolated from the emitter of the transistor 45, and the emitter assumes a positive voltage from the voltage source 56. The transistor therefore starts to conduct and a positive pulse appears at output terminal 46. The output pulse duration is timed by the clock pulses applied at terminal 47, to the base of the transistor 45. The semi-conductor diode 57, is connected between the high potential end of the secondary of the transformer 58, and the output terminal 46. The primary purpose of the diode 57 is to prevent the current surge which is developed across the transformer secondary in the period between the output pulses, from appearing at the output terminal 46. The foregoing circuit is described in greater detail in J. H. Felker's Patent 2,853,629, issued September 23, 1958.

Figure 5:
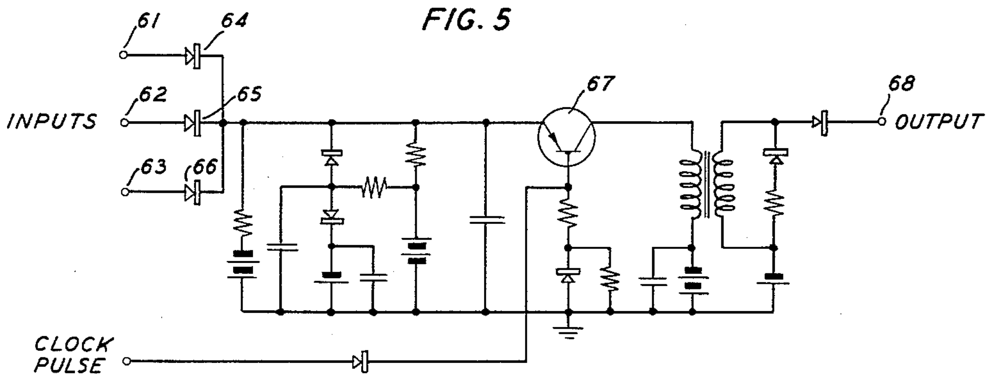
Fig. 5 shows a detailed circuit diagram of one form of OR unit.

Fig. 5 illustrates an OR circuit including a pulse regenerator which differs from the AND circuit of Fig. 4, only in the input circuit. The input terminals 61, 62, 63 of the OR unit of Fig. 5, are coupled to the semiconductor diodes 64, 65, and 66 respectively. The terminals 61, 62, and 63 are normally slightly negative in their potential level. When a positive pulse is applied for example to one of the input terminals 61, the emitter of the transistor 67, is driven positive, the transistor 67 conducts, and a pulse appears at output terminal 68. Because the diodes 65, 66, associated with the other two input terminals 62 and 63 are both in high resistance condition, they are isolated from the circuit and cannot affect its operation as in the case of the AND circuit of Fig. 4. Accordingly, an output pulse will appear at terminal 68 whenever any one of the input leads 61, 62, or 63 is energized.

The circuits of Figs. 4 and 5 are mass produced and put up in small packaged units. As mentioned above, the circuit of Fig. 4 is an AND unit, and the circuit of Fig. 5 is an "active" OR unit. In the technology illustrated by Figs. 4 and 5, logic units of the AND type always require the full pulse regenerator circuit; an "inactive" OR unit, however, can often be realized without the use of a full pulse regenerator circuit, i.e. merely by the use of three input diodes the outputs of which are connected together and to a suitable biasing source.

Figs. 6 and 7 illustrate a simple logic circuit in which the function of an OR unit is provided without the use of an "active" OR circuit of Fig. 5. In Fig. 6, the output of three AND packages 76, 77 and 78 are shown connected together and to the input of a fourth AND package 79. The four leads from the four AND units are merely soldered together as indicated at 81 in Fig. 6. However, the resulting logic circuit diagram is shown in Fig. 7 as including the OR unit 83. This is made possible by the diode 57 (shown in Fig. 4) which is present in the output lead of each of the three AND units 76, 77 and 78 of Fig. 6. In addition to its function of blocking transformer surges from the output circuit, the diode 57 of the pulse regenerator of each of these AND units may also serve as one of the diode inputs of an "inactive" OR circuit. For example, when the output terminals of three AND units are connected together, the diodes in the AND output circuits form an "inactive" OR circuit in the same manner as the three diodes 64, 65 and 66 of Fig. 5. Thus, the "inactive" OR circuit 83 of Fig. 7 is realized with essentially no circuitry in addition to the four AND units 76 through 79. Inactive OR units of the type shown at 83 in Fig. 7 are designated by a legend "OR" followed by the symbol "(+)" to distinguish them from "active" OR units which include a pulse regenerator.

Figs. 4 through 7 are introduced to show one technology in which OR units can be realized much more inexpensively than AND units. As will be developed more fully hereinafter, the use of "switching by swamping" techniques in such a technology can result in substantial economies.

Figs. 8, 9, and 10 together represent a single logic circuit diagram of a computer storage unit which employs the logical circuit elements shown in Figs. 4 and 5. Fig. 8–A illustrates the relative positions of Figs. 8, 9, and 10 which are presented on sheets 3, 4, and 5, respectively, of the drawings. In addition to the AND units and the OR units discussed above, the circuit of Figs. 8 through 10 also includes inhibit, delay, and memory units. The logic circuit function of each of these units is as follows:

An OR unit, such as 33 or 34 in Fig. 3, yields a pulse output if a pulse is present at any of the inputs to the OR unit.

An AND unit, such as 38 in Fig. 3, requires energization of all inputs to yield an output pulse.

An inhibit unit, such as 129 or 138 in Fig. 8, is designated by a box with the legend "Inh" therein. It is generally similar to an AND unit in that all of the normal inputs to the inhibit unit must be energized for it to yield an output pulse. However, a pulse on the inhibit input lead which is marked with a semicircle at the point where the inhibit lead is connected to the inhibit unit, over-rides all other signals and blocks the output of the unit. The inhibit unit may also be employed to effect the negation of binary numbers. Thus, if an inhibit unit having one normal input and one inhibit input has the normal input excited continuously, signals applied to the inhibit input terminal will be negated. That is, pulses applied to the inhibit terminal will result in the absence of a pulse at the output of the inhibit unit and, conversely, a pulse will be present at the output of the inhibit unit when there is no pulse applied to the inhibit terminal.

Memory units, such as unit 144 in Fig. 8, are designated "M" and may be set to either of two conditions, the "0" state or the "1" state. When a memory unit is set to the "0" state, it has no output. When the "set 1" lead has been energized, however, the memory unit generates pulses one at each digit interval until the memory unit is reset to the "0" condition. When both input leads are energized simultaneously, the unit assumes the "0" state, and has no output.

Delay units such as those shown at 123 and 124 in Fig. 8 are indicated by boxes with the letter "D" therein together with a number indicating the number of digit periods of delay included in the unit. The AND units, the inhibit units, the memory units, and the active OR units also introduce a delay of one-quarter digit period each. The "inactive" OR units, such as unit 83 of Fig. 7, which do not include a pulse regenerator, have essentially no delay.

Memory units, inhibit units, and "active" delay units, also include the pulse regenerator circuit shown in the circuits of Figs. 4 and 5 which has a diode in the output lead. Inactive OR units can therefore be realized after these units as well as after AND units.

Figs. 4 and 5 disclose the AND and OR circuits which are used in the illustrative circuit of Figs. 8, 9 and 10. The pulse regenerator shown in Figs. 4 and 5 is also a principal component of the inhibit, memory and delay circuits. The slight changes required for the different functions are disclosed in an article entitled "Regenerative Amplifier for Digital Computer Applications," by J. H. Felker, which appeared at pages 1584 to 1596 of the November 1952 issue of the "Proceedings of the I.R.E." (volume 40, Number 11). The storage unit of Figs. 8, 9 and 10 stores sixteen digit binary numbers in delay loops. The standard pulse repetition rate of the computer circuits employed in the circuit of Figs. 8, 9 and 10 is one megacycle per second. Each sixteen digit binary number includes sixteen time slots, with the time period between successive time slots being equal to one microsecond. A binary number appears as a pattern of pulses and spaces, with some of the time slots being vacant and some including pulses.

The delay loops, or storage registers, 101, 102 . . . 112 in Figs. 8 and 9 are the heart of the storage unit. The balance of the circuitry disclosed in Figs. 8, 9 and 10 is required to place numbers in storage in these registers, and to remove them from storage when they are needed at another point in the computer.

The storage register 101 includes four logic circuit elements, the AND unit 121, the OR unit 122, and two delay units 123 and 124, the first of which includes thirteen and one-half digit periods of delay, and the second including two and one-quarter digit periods of delay. Numbers from the arithmetic unit of the computer are introduced into the storage unit at lead 126. The signals on lead 126 are applied to the normal input lead 128 of the inhibit unit 129. If there is no signal applied to the inhibit terminal 130 of the inhibit unit 129, the number from lead 126 will be admitted to the storage register 101 through the inhibit unit 129 and the OR unit 122. These conditions are met when a write order is present on lead 131, and when register 101 is selected by an address order on lead 132. The inhibit terminal 130 of the inhibit unit 129 is connected to the output of the OR unit 135. For the inhibit terminal 130 to be de-energized, the two inputs of the OR unit 135 must also be de-energized. The upper input lead 136 of the OR unit 135 is connected to lead 85 which is, in turn, connected to the write order lead 131 by an inhibit unit 138 connected as a negator. Accordingly, when pulses are present on lead 131, the upper input 136 to the OR unit 135 is de-energized. When the address order lead 132 is energized concurrently with a gate address order on lead 139, the AND unit 141 transmits a pulse to the "set 0" input 142 of the memory unit 144. With the memory unit 144 set to the "0" state, there will be no input signal on the other input lead 146 of the OR unit 135, and the inhibit terminal 130 of the inhibit unit 129 will be de-energized.

Read-out is accomplished by the selection of the appropriate address lead 132 in the absence of a write order on lead 131. This sets the memory unit 144 to the "0" condition, and blocks the continuous train of pulses which is normally applied to the input lead 148 of the OR unit 149. Through the techniques of "switching by swamping" discussed above in connection with Figs. 1 and 2, for example, the output from OR unit 149 reproduces the number which has been circulated in the storage register 101. Because only one storage register is selected during any one time period, the control leads 151 and 152 of the OR units 153 and 154 associated with the other storage registers in the storage unit are energized and yield a continuous train of pulses at leads 87 and 88 at the output of the OR units 153 and 154, respectively. Similarly (referring to Fig. 10), all of the inputs to the three AND units 156, 157, and 158 are continuous trains of pulses, except that from the OR unit 149. The information from storage unit 101 will be transmitted from the OR unit 149 along lead 159 through the AND unit 156 and the AND unit 161 to one-quarter digit delay unit 163. The AND unit 165 is used to select information from the storage registers 101 through 112, or from the constant number generator 167. When a number is being read from one of the storage registers, however, a continuous train of pulses is applied to the AND unit 165 by the constant generator 167. Accordingly, the pulses from storage register 101 are gated through AND unit 165 to the output lead 168 from the storage unit. The OR unit 171 is energized by pulses from the write order lead 131 along lead 173 to prevent read-out from the storage unit when a write order is present on lead 131.

The storage registers 101, 102 may be cleared by the de-energization of clear order lead 91 for 16 digit periods. The de-energization of clear order lead 91 removes one of the required inputs of AND unit 121 in the delay register and blocks the circulation of pulses. After 16 digit periods, the 16 digit delay registers 101, 102 are cleared.

The control circuits associated with storage register 112 are somewhat more complex than those associated with registers 101 and 102, in order to permit concurrent writing-in and reading-out of the storage register. The read-out circuits, including memory unit 175 and OR unit 154, operate in substantially the same manner as memory unit 144 and OR unit 149 associated with storage register 101. Special write order and number input leads 176 and 178 are provided to control insertion of numbers into the storage register. The AND unit 179 and the memory unit 181 control the energization of the AND unit 183 and the inhibit unit 184. When the memory unit 181 is set to the "0" condition, the AND unit 183 is not enabled, and the number circulating in the delay register 112 is blocked. In addition, when the memory unit 181 is set to the "0" condition, the inhibit terminal 185 of the inhibit unit 184 is de-energized, and a number from the number input lead 178 may enter the storage register 112 through the inhibit unit 184. The separate input and output control circuits discussed above thus permit concurrent entry and withdrawal of numbers from storage register 112.

The converging switch employed in the storage unit of Figs. 8, 9 and 10 includes the OR units 149, 153 and 154, and the AND units 156, 157, 158 and 161. The inputs from nine other storage registers are applied to input leads 187 of the AND units 156 through 158. None of the twelve OR units associated with the storage registers 101 through 112 requires a pulse regenerator circuit for the reasons set forth above in connection with Figs. 6 and 7. The AND units 156, 157, 158 and 161, however, do require a pulse regenerator circuit. Accordingly, the converging switch itself requires only four amplifiers, or pulse regenerators. The conventional alternative to the "switching by swamping" converging switch shown in Figs. 8, 9 and 10 would be a blocking switch in which the AND and OR units are interchanged. Thirteen amplifiers are required in the case of the prior art "switching by blocking" circuit, one after each AND unit and one after the last OR unit. In the case illustrated in Figs. 8, 9 and 10, therefore, the use of "switching by swamping" has saved nine amplifiers.

The saving in amplifiers in the converging circuit is by no means the only advantage which "switching by swamping" brings to the storage register circuit. An additional saving in amplifiers is possible because the "set 1" inputs of the memory units, such as 144 in Fig. 8, are easier to drive than the "set 0" inputs. In the storage unit circuit of Figs. 8 through 10, one input of each of the memory units, such as unit 144 in Fig. 8, associated with each register 101, 102 . . . 112, is driven individually by an appropriate address order. For example, the "set 0" input of memory unit 144 is energized directly by the AND unit 141 (which includes an amplifier). The "set 1" inputs to the memory units are energized in parallel by reset order pulses on lead 169. Because there are twelve memory units which must be driven by the reset pulse, the power requirement at each input of the memory units becomes critical in determining how many standard amplifiers are required to set the memory units to the desired state. The memory units of the present storage unit (which are described in the article and patent of J. H. Felker cited above) require substantially more power for the energization of the "set 0" lead than for energization of the "set 1" lead. "Switching by swamping" requires that the individual address orders be applied to the "set 0" input (which is more difficult to drive), and that the reset order be applied to the "set 1" lead (which is easier to drive). Therefore, because the rest order, which must be applied to twelve memory units, is applied to the terminal which is easier to drive, only three standard amplifiers are required. The equivalent blocking circuit would require the energization of all of the "set 0" inputs to the memory units by the reset order, and would require six standard amplifiers. Accordingly, three additional amplifiers are saved in the reset order circuit by the use of "switching by swamping."

Another advantage of "switching by swamping" arises from the fact that energization of the "set 0" input of the memory units of Figs. 8 through 10, over-rides the energization of the "set 1" lead. Therefore, when an address pulse is applied to the "set 0" input of a memory unit concurrently with the application of a reset pulse to the "set 1" input, the memory unit is properly set to the "0" state. Because the reset and address pulses may be applied simultaneously, successive sixteen digit binary numbers may be entered or withdrawn from the storage unit without requiring a "guard space," or time interval, between numbers. If blocking switches were employed, however, the address pulses would be applied to the "set 1" terminals of the memory units and the reset to the "set 0." As a consequence, the reset and address pulses would have to be applied successively lest the reset nullify the address pulse. This would require so much time that a guard space would have to be provided between numbers applied to the unit to switch from one of the registers 101, 102 . . . 112 to another. The conservation of switching time which is made possible by "switching by swamping," and the resultant increased utilization of the storage register is perhaps even more important than the savings in equipment noted above.

Fig. 11 shows a shift register for a synchronous electronic information handling system. Serial information is fed into the circuit at lead 191, and can then be held and read out in parallel at leads 192, 193 . . . 194; or the information can be advanced as desired and read out in serial form at lead 195.

Although only a few stages 201, 202 . . . 203 of the shift register are illustrated in Fig. 11, it is contemplated that additional stages may be employed. Stage 201, for example, includes two OR units 206 and 207, an AND unit 208, and a one-half digit period delay unit 209. An amplifier, or pulse regenerator, 211 is associated with the AND unit 208, but is not required after the OR units 206, 207, for reasons explained in connection with Figs. 3 and 4. Similarly, one delay unit 209 is followed by the pulse regenerator 213. With each pulse regenerator 211, 213 introducing one-quarter digit period of delay, the delay loop in stage 201 has a total delay of one digit period.

The amplifier units such as 211 are shown separate from the logic circuit elements in Figs. 11 and 12 to emphasize the difference between the "switching by swamping" shift register stage shown at 201 of Fig. 11 and the comparable stage of a switching by blocking shift register shown in Fig. 12. Inasmuch as all of the amplifiers, or pulse regenerators of Figs. 11 and 12 are shown separately from the logic circuits, the OR units are "inactive" and are therefore represented by the legend "OR" followed by the symbol "(+)" as mentioned above. Similarly, "inactive" AND, delay, and inhibit units are distinguished from the active units which appear in other figures by underlining the legend. Thus, for example, an inactive AND unit is designated "AND."

The two OR units 206 and 207 with the AND unit 208 form a converging switch which may select information either from lead 191 or from amplifier 213. The control signal is applied from an amplifier to input lead 214. The signal on lead 214 is connected through an amplifier 216 to the control input of the OR unit 206. The control signal on lead 214 is negated in the inhibit unit 215 and applied to the other OR unit 207. When pulses are present at the control input lead 214, the signal applied at lead 191 will be "swamped" by the control pulses applied to the OR unit 206 and the single binary digit of information in stage 201 will circulate in the delay loop made up of OR unit 207, AND unit 208, amplifier 211, delay unit 209 and amplifier 213. When no signals are applied at lead 214, however, the stage 201 accepts information from the signal input 191, instead of from amplifier 213.

The amplifiers 216 and 217 are employed to drive the OR units 206 and 207, respectively, of register 201, and also to supply the control pulses to the OR units in each of the registers 202, . . . 203. In Figs. 4 through 7 described above the manner of forming an "inactive" OR unit at the output of several pulse regenerator units was developed. In the circuit of Fig. 11, however, where several inactive OR units are formed at the output of a single pulse regenerator (such as 216 and 217) one additional diode is required for each additional OR unit which is formed. Referring to Fig. 4, for example, the additional diodes are connected from the secondary of transformer 58 to additional outputs, in fashion similar to the connection of diode 57. Accordingly, the amplifiers 216 and 217 each have in effect a separate output lead for each stage which is controlled. For example, amplifier 216 has several output leads 218, 219, . . . 220, each of which includes a diode at the output. Leads 218, 219, . . . 220 are connected to control inputs of corresponding OR units in stages 201, 202, . . . 203 respectively. Similarly, the amplifier 217 has several buffered output leads 228, 229, . . . 230 which are connected to the other set of corresponding OR units in stages 201, 202, . . . 203, respectively. The amplifiers following the one-half digit delay unit in each state of the register similarly require two buffered outputs. This is illustrated by amplifier 213 in stage 201, for example.

The stages 202, . . . 203 which represent any desired number of stages, operate in the same manner as stage 201. Thus, when control pulses are applied at lead 214, the information is stored in stages 201, 202, . . . 203. When no pulses are applied at lead 214, the serial binary information applied at lead 191 is progressively shifted from stage to stage of the shift register.

In Fig. 12, one stage of a shift register such as that shown in Fig. 11 is shown, with the changes required to employ "blocking" switches rather than "swamping" switches. The circuit of Fig. 12 employs two AND units 221, 222, their associated pulse regenerators 223, 224, the OR unit 225, the one-half digit period delay unit 226 and its associated pulse regenerator 227. The control circuits for the AND units 221 and 222 are the same as those shown in Fig. 11 for the OR units 206 and 207.

Comparing the "switching by swamping" circuit of Fig. 11 with the blocking circuit of Fig. 12, it is evident that one less amplifier is required for each stage of the former circuit as compared with the latter circuit. When a considerable number of shift registers are required, each having many stages, substantial economies may be realized by employing the "switching by swamping" circuitry.

Figs. 13, 14 and 15 are a series of converging-diverging switches which illustrate the economy which may be obtained through consolidation when alternate levels of "switching by swamping" and blocking are employed. Fig. 13 shows a conventional converging-diverging switch in which the portion 231 is the converging circuit, and in which portion 232 is the diverging circuit. The converging circuit 231 includes the AND units 233, 234, and 235, and the OR unit 236. In the converging circuit 231, one of the signals applied to leads 237, 238 and 239 is selected by energizing the corresponding control leads 241, 242 or 243, respectively. Similarly, the two AND units 245 and 246 in the diverging circuit 232 direct the signal from OR unit 236 to output lead 248 or 249, respectively, in accordance with the energization of control leads 251 or 252.

In Fig. 14, a converging-diverging switch is shown in which the converging circuit is of the "switching by swamping" type, while the diverging switch is a blocking switch. The converging switch 254 operates as described hereinbefore in connection with Fig. 1, and the diverging switch 255 is identical with diverging switch 232 of Fig. 13 described briefly in the preceding paragraph. It should be noted that the AND unit 257 in the converging switch 254 is now connected directly to the AND units 258 and 259 of the diverging switch 255.

When two successive levels of switches include logic units of the same type, consolidation is usually possible. Accordingly, Fig. 15 illustrates the consolidated version of Fig. 14. In Fig. 15, it is desired to connect any one of the input circuits 261, 262, 263 to either or both output circuits 264 and 265. The OR units 271, 272 and 273 have control input circuits 274, 275 and 276, respectively. One of the input circuits 261, 262 or 263 is selected by deenergizing the corresponding control lead 274, 275 or 276. Assuming that signal lead 261 is selected by the deenergization of control input 274, the output of the OR unit 271 at point 281 is the signal applied at 261. The output of each of the other OR units 272 and 273 at points 282 and 283 is a continuous train of pulses. Each of the AND units 285 and 286 has inputs from points 281, 282 and 283. In addition, the AND unit 285 has a control input 287, and the AND unit 286 has a control input 288. The energization of control lead 287 provides the third required enabling signal to gate the signal information appearing at terminal 281 through the AND unit 285. Energization of control input 288 similarly gates the signal information at point 281 through to output lead 265.

The switch of Fig. 15 thus accomplishes the same function as that of Fig. 13, with five logic units instead of six. In addition, when employed in combination with other logic circuitry, it requires only two amplifiers instead of the five required by the circuit of Fig. 13.

Figs. 16 and 17 represent a part of the circuit of a triple address program unit for an electronic computer. As indicated in Fig. 16, the program is stored in an OR matrix. The leads 291, 292 and 293 represent successive steps of the program, and are excited in turn to indicate which step of the program is being performed. Each step of the program is divided into three substeps which are designated A, B and C. During substep A, program information from the wires $\alpha$ and $\alpha'$ must be transmitted to output leads W and X, respectively; during substep B, program information must be transmitted from the wires $\beta$ and $\beta'$ to output leads W and X; and similarly, during substep C, output information must be transmitted from wires $\gamma$ and $\gamma'$ to the output leads. The converging switches 296 and 297 control the substep switching operations noted above.

During the main program step in which lead 292 is energized, for example, during subintervals A and B, lead W receives no signal output from the energized lead 292, because there are no diodes connected between lead 292 and wires $\alpha$ and $\beta$. However, diodes 298 and 299 are connected between lead 292 and wires $\alpha'$ and $\beta'$. Accordingly, output lead X is energized during substeps A and B. During substep C, diode 300, which is connected between lead 292 and wire $\gamma$, provides a signal path to energize lead W, while lead X is not energized.

Fig. 17 illustrates the use of "switching by swamping" techniques for realizing the converging switches 296 and 297 of Fig. 16 in an economical manner. In Fig. 17, the converging switch includes the leads 301, 302 and 303; the leads $\alpha$, $\beta$, and $\gamma$; and the diodes 306, 307 and 308 which interconnect leads 301 and $\alpha$, leads 302 and $\beta$, and leads 303 and $\gamma$, respectively. In accordance with the "switching by swamping" techniques described above, information on lead $\alpha$ is transmitted to lead W during substep A by de-energizing lead 301 associated with lead $\alpha$. Control signals are concurrently applied to leads 302 and 303, which are associated with leads $\beta$ and $\gamma$, respectively. The control signals on leads $\beta$ and $\gamma$ at the input to AND unit 311 gate the signal from the program matrix through to the output lead W. In the example considered above, during substep A of the step in which lead 292 is energized, the signal would be "0," because there is no diode interconnecting lead 292 and wire $\alpha$.

Similarly, the converging switch 296 associated with lead W selects the $\beta$ signal input lead during substep B, and the $\gamma$ signal input lead during substep C. The converging switch 297 associated with lead X similarly selects the appropriate program signal lead $\alpha'$, $\beta'$, or $\gamma'$ during the corresponding substep A, B or C.

In the circuit of Fig. 17, the diodes along any vertical lead in the program matrix 314 form an OR unit. When "switching by swamping" is employed in the converging switch, the input OR level of the switch (including diodes 306, 307, and 308) is adjacent the OR circuitry of the program matrix, and consolidation is possible as illustrated in Fig. 17. If the converging switches 296 and 297 of Fig. 16 were of the blocking type, however, an additional level of logic circuitry would be required.

Fig. 18 illustrates a converging network in which it is desired to transmit signal information from any one of eight signal input leads 321 through 328 to the output lead 329. It is a further requirement that the switching circuit be controlled by a three digit binary code. In addition, the OR and the AND logic circuits which are employed have only three input circuits, and require an amplifier after every two levels of logic circuitry. In the circuit of Fig. 18 the amplifier units have been shown separately. Accordingly, the AND and OR units which appear in Fig. 18 are all "inactive," and are so designated.

The eight signal input leads 321 through 328 are connected to AND units 331 through 338, respectively. The AND units 331 through 338 are also provided with eight control input leads 341 through 348. In the first level of switching, blocking techniques are employed; and the signals are gated through or blocked at the AND units 331 through 338 depending on the presence or absence, respectively, of pulses on the corresponding control leads 341 through 348, respectively.

The second level of the converging circuit is a "switching by swamping" level, and accordingly includes the OR units 351 through 354. Each OR unit 351 through 354 is also provided with a signal input lead 335 through 358, respectively. Following the OR units is the bank of amplifiers 361 through 364 required after two levels of logic circuitry.

The AND units 366 and 367 each receive the output signals from two of the OR units of the second level. The AND units 366 and 367 also include control input leads 368 and 369. The output leads from the AND units 366 and 367 are combined in a simple OR unit 371. A final amplifier 372 couples the output from the OR unit 371 to the output lead 329.

The following table indicates the selected signal input lead 321 through 328 when various permutations of a three digit binary code are applied to the control input leads of the switching circuit. In the following table the letters A, B, and C indicate the three digits of the binary code, and the primed letters A', B', and C' are the negated representation of the digits A, B and C, respectively. The signal input leads in Fig. 18 are all designated by one of the six possible binary code designations noted above, and are energized accordingly.

*Table II*

| Binary Control Energization Code | | | Selected Signal Input |
|---|---|---|---|
| A A' | B B' | C C' | |
| 0 1 | 0 1 | 0 1 | 326 |
| 1 0 | 0 1 | 0 1 | 328 |
| 0 1 | 1 0 | 0 1 | 325 |
| 1 0 | 1 0 | 0 1 | 327 |
| 0 1 | 0 1 | 1 0 | 322 |
| 1 0 | 0 1 | 1 0 | 321 |
| 0 1 | 1 0 | 1 0 | 324 |
| 1 0 | 1 0 | 1 0 | 323 |

Referring to Fig. 18, the required control lead energization for the selection of signal 326 will now be considered. In order for signal 326 to be gated through AND unit 336, control lead 346 must be energized. Inasmuch as control lead 346 is designated B′, B′ must be "1" and B is therefore "0." The next level of logic circuitry including OR unit 353 is a "switching by swamping" circuit. Therefore, control lead 357, which is also labelled A must be de-energized for the transmission of signal 326 through OR unit 353. The control signal A is thus equal to "0," and its negated value A′ must be "1." The control lead 369 of the blocking logic element 367 must be energized to gate the signal through the AND unit 367. Accordingly, C′ is "1," and C is equal to "0." Note that these values of the binary code correspond to the first line of Table II. The first line of Table II also indicates that this binary code results in the selection of signal input 326.

The converging switch of Fig. 18 requires only fifteen logic circuit elements and five amplifiers. This is in contrast to a converging network employing blocking techniques throughout which would require twenty-one logic units and seven amplifiers. The number of levels of logic circuitry is also reduced from six to four. In addition to the saving in terms of amplifiers noted above, the reduction in the number of levels substantially reduces the delay introduced by the switching circuit.

It is to be understood that the above-described arrangements are illustrative of the application of the principles of the invention. Numerous other arrangements, such as the use of digital signals other than serial binary signals, may be devised by those skilled in the art without departing from the spirit and scope of the invention.

What is claimed is:

1. In a switching circuit, an AND gate having a plurality of inputs; a plurality of OR gates connected respectively to the inputs of said AND gate, each OR gate having at least two inputs, one of the inputs of each OR gate being a signal information input and another input of each OR gate being a switching control input; and means for selecting the signal input associated with a predetermined one of said OR gates and gating the information signal developed therein during a predetermined period of time through to the output of said AND gate, said means including circuital means for de-energizing all control inputs of said predetermined OR gate and applying non-information control signals to at least one control input of each of the rest of said plurality of OR gates for the duration of said predetermined period of time to nullify the significance of information signals applied to said signal information inputs of the rest of said plurality of OR gates.

2. In a switching circuit, an AND gate having a plurality of inputs, a plurality of OR gates connected to the inputs of said AND gate, each OR gate having at least two inputs, one of the inputs of each OR gate being a signal information input and another input of each OR gate being a switching control input, means for applying binary signal information to each signal input, and means for selecting the signal input associated with a predetermined one of said OR gates and gating it through to the output of said AND gate, said last-mentioned means including circuital means for de-energizing all control inputs of said predetermined OR gate and for applying non-information control signals to a control input of each of the rest of said plurality of OR gates for the duration of the information signal on the selected signal input associated with said predetermined OR gate.

3. In a switching circuit, an AND gate having a plurality of inputs, a plurality of OR gates connected respectively to the inputs of said AND gate, each OR gate having at least two inputs, one of the inputs of each OR gate being a signal information input and another input of each OR gate being a switching control input, and means for selecting the signal input associated with a predetermined one of said OR gates and gating it through to the output of said AND gate, said means including circuital means for applying non-information control signals to a control input to each of said plurality of OR gates except said predetermined OR gate for the duration of the information signal on the selected signal input associated with said predetermined OR gate.

4. A combination as defined in claim 3 wherein a memory unit is connected to the control input of each of said OR gates.

5. A combination as defined in claim 3 wherein a diode matrix is coupled to the signal inputs of said OR gates.

6. A combination as defined in claim 3 wherein a plurality of AND gates are coupled to the signal inputs of said OR gates.

7. In a serial binary computer circuit in which a multidigit binary number appears at any given point in the circuit in electrical pulse form in a predetermined signal transmission time interval, and AND gate, a plurality of OR gates each having its output connected to respectively different inputs of said AND gate, each said OR gate having at least one signal input and at least one control input, means for applying binary digital numbers in electrical pulse form to the signal inputs of said OR gates, and means connected to a control input of each of said OR gates for applying non-information control signals thereto, and means for de-energizing the control signal applying means connected to one and only one of said OR gates during time intervals corresponding to said predetermined signal transmission time interval.

8. A circuit as defined in claim 7 wherein said control signal applying means includes a memory unit connected to a control input of each of said OR gates.

9. A shift register comprising a plurality of successive stages; each stage including an AND gate, a first OR gate and a second OR gate coupled to respective inputs of said AND gate, each said OR gate including a signal and a control input, and a delay loop coupled from the output of said AND gate to the signal input of said first OR gate; means connecting the output of the delay loop of each stage to the signal input of the second OR gate of the next successive stage; and signal control means for selectively energizing the control input of one of the two OR gates in each stage and for concurrently de-energizing the control input of the other OR gate of each stage.

10. A shift register comprising a plurality of successive stages; each stage including an AND gate, a first OR gate and a second OR gate coupled to respective inputs of said AND gate, each said OR gate including a signal and a control input, and a delay loop coupled from the output of said AND gate to the signal input of said first OR gate; means connecting the output of the delay loop of each stage to the signal input of the second OR gate of the next successive stage; and signal control means for selectively energizing the control input of one of the two OR gates in each stage and for concurrently de-energizing the control input of the other OR gate of each stage; whereby signals are progressively shifted from stage to stage of said shift register or stored in the individual stages of said register depending on the selective energization of said OR gates in each stage.

11. In a serial binary computer circuit in which multidigit binary numbers appear at points in the circuit in the form of electrical pulse trains during successive signal transmission time intervals, an AND gate, at least three OR gates each having its output connected to respectively different inputs of said AND gate, each said OR gate having at least one signal input and at least one control input, storage means for registering respectively different binary numbers, means for concurrently applying the different binary numbers registered in said storage means to the signal inputs of the respective OR gates during signal transmission time intervals, memory cells connected respectively to the control inputs of each of said OR gates, and means for de-energizing one of said memory cells and for energizing the remainder of said memory cells for the duration of each of said signal transmission time intervals.

12. A switching circuit for selectively applying one of a plurality of binary pulse signals appearing in successive digit periods to a single output terminal comprising an AND gate having a plurality of inputs and an output, a plurality of OR gates, each having at least a first information input, a second control input, and an output connected to one of said AND gate inputs, means for applying binary information signals to said first information inputs from signal sources, and control circuit means for applying non-information control pulses to at least one second control input of each OR gate but a selected OR gate to nullify the significance of information signals applied to said each OR gate thereby selectively to switch the information signal appearing at said first information input of said selected OR gate to said AND gate output.

13. A switching circuit in accordance with claim 12 wherein said control circuit means includes memory means individual to each of said OR gates, means for causing each of said memory circuits individual to said each OR gate to energize said each OR gate control inputs during the digit periods of said information signal, and means for causing said memory circuit individual to said selected OR gate to de-energize said control input of said selected OR gate.

References Cited in the file of this patent

UNITED STATES PATENTS

| | | |
|---|---|---|
| 2,693,907 | Tootill | Nov. 9, 1954 |
| 2,712,065 | Elbourn et al. | June 28, 1955 |
| 2,729,773 | Steele | Jan. 3, 1956 |
| 2,735,082 | Goldberg et al. | Feb. 14, 1956 |

OTHER REFERENCES

Electrical Engineering, December 1952, pp. 1103–1108, "Typical Block Diagrams for a Transistor Digital Computer," by Felker.

Washburn: "An Application of Boolean Algebra to the Design of Electronic Switching Circuits," Communications and Electronics, September 1953, pp. 382, 384.

Ross: "The Arithmetic Element of the IBM Type 701 Computer," Proc. IIR, October 1953, p. 1290.